US012525122B2

(12) United States Patent
Cho

(10) Patent No.: US 12,525,122 B2
(45) Date of Patent: Jan. 13, 2026

(54) FIRE ALARM APPARATUS FOR UNWANTED ALARM

(71) Applicant: ROZETATECH Co., Ltd., Seongnam-si (KR)

(72) Inventor: Youngjin Cho, Okcheon-gun (KR)

(73) Assignee: ROZETATECH Co., Ltd., Seongnam-si (KR)

( * ) Notice: Subject to any disclaimer, the term of this patent is extended or adjusted under 35 U.S.C. 154(b) by 373 days.

(21) Appl. No.: 18/247,079

(22) PCT Filed: Sep. 29, 2021

(86) PCT No.: PCT/KR2021/013353
§ 371 (c)(1),
(2) Date: Mar. 29, 2023

(87) PCT Pub. No.: WO2022/071758
PCT Pub. Date: Apr. 7, 2022

(65) Prior Publication Data

US 2023/0368650 A1 Nov. 16, 2023

(30) Foreign Application Priority Data

Sep. 29, 2020 (KR) ........................ 10-2020-0126593

(51) Int. Cl.
*G08B 25/00* (2006.01)
*G08B 17/117* (2006.01)
*G08B 29/18* (2006.01)

(52) U.S. Cl.
CPC .......... *G08B 29/188* (2013.01); *G08B 17/117* (2013.01); *G08B 25/009* (2013.01)

(58) Field of Classification Search
CPC ................ G08B 29/188; G08B 17/117; G08B 25/009; G08B 29/186; G08B 25/14; G08B 17/00; G08B 25/10; G08B 29/145; G08B 29/18
See application file for complete search history.

(56) References Cited

U.S. PATENT DOCUMENTS 5,818,326 A * 10/1998 Winterble .............. G08B 17/10 340/522
7,142,105 B2 * 11/2006 Chen ...................... G08B 29/24 340/521

(Continued)

FOREIGN PATENT DOCUMENTS

JP 2008234533 A 10/2008
JP 2019074837 A 5/2019

(Continued)

OTHER PUBLICATIONS

International Search Report Received in International Application No. PCT/KR2021/013353 mailed on Jan. 12, 2022, 7 pages.

*Primary Examiner* — Nay Tun
(74) *Attorney, Agent, or Firm* — HoustonHogle LLP

(57) ABSTRACT

A fire alarm apparatus with non-fire alarm prevention function according to an embodiment of the inventive concept includes a plurality of sensing units having different address information and configured to generate a fire detection signal when each sensing unit detects at least one of smoke, temperature, humidity, and gas to determine a fire situation, a repeater configured to perform wireless communication with each of the plurality of sensing units, a receiver configured to perform wireless communication with the repeater, and a first server configured to perform wireless communication with the receiver and determine the fire situation based on the fire detection signal, wherein the first server includes a big data reception unit configured to receive big data from an external second server, and a non-fire alarm determination unit configured to determine validity of the fire detection signal based on the big data and values detected by each of the plurality of sensing units based on different criteria for each situation.

12 Claims, 15 Drawing Sheets

(56) References Cited

U.S. PATENT DOCUMENTS

| | | | | |
|---|---|---|---|---|
| 2002/0174367 | A1 * | 11/2002 | Kimmel | G08B 13/19682 726/4 |
| 2016/0180239 | A1 * | 6/2016 | Frankel | G06V 40/172 706/12 |
| 2020/0288295 | A1 * | 9/2020 | Martin | H04M 3/5116 |

FOREIGN PATENT DOCUMENTS

| | | | | |
|---|---|---|---|---|
| JP | 2020024692 | A | * | 2/2020 |
| KR | 20170112465 | A | | 10/2017 |
| KR | 20190138260 | A | | 12/2019 |
| KR | 102132355 | B1 | | 7/2020 |

* cited by examiner

FIRE ALARM APPARATUS FOR UNWANTED ALARM

TECHNICAL FIELD

The inventive concept relates to a fire alarm apparatus having a non-fire alarm prevention function, and more particularly, to a fire alarm apparatus having a function to prevent fire alarms in which the reliability of non-fire alarm determination is improved by determining non-fire alarms using big data and values measured by a plurality of sensing units.

BACKGROUND ART

A fire alarm apparatus is a device that detects smoke from a fire with a sensing unit and informs of a fire situation when a fire occurs. Since the fire alarm apparatus uses a sensing unit to determine a fire, it is highly likely to cause malfunction by mistaking smoke or cigarette smoke from cooking food as fire smoke. If the fire alarm apparatus continuously malfunctions due to the above factors, users may lose trust in the fire alarm apparatus and turn off the power of the fire alarm apparatus normally. In this case, users may be exposed to the risk of fire even when an actual fire occurs in a building in which a fire alarm apparatus is installed.

DISCLOSURE OF THE INVENTION

Technical Problem

An object of the inventive concept is to provide a fire alarm apparatus having a function to prevent fire alarms with improved reliability of non-fire alarm determination by determining non-fire alarms using big data and values measured by a plurality of sensing units.

Technical Solution

A fire alarm apparatus with non-fire alarm prevention function according to an embodiment of the inventive concept includes a plurality of sensing units having different address information and configured to generate a fire detection signal when each sensing unit detects at least one of smoke, temperature, humidity, and gas to determine a fire situation, a repeater configured to perform wireless communication with each of the plurality of sensing units, a receiver configured to perform wireless communication with the repeater, and a first server configured to perform wireless communication with the receiver and determine the fire situation based on the fire detection signal, wherein the first server includes a big data reception unit configured to receive big data from an external second server, and a non-fire alarm determination unit configured to determine validity of the fire detection signal based on the big data and values detected by each of the plurality of sensing units based on different criteria for each situation.

The non-fire alarm determination unit may determine validity of the fire detection signal based on an increase rate of temperature measured from each of the plurality of sensing units for a predetermined time.

The non-fire alarm determination unit may determine whether a value detected by each of the plurality of sensing units is invalid data such as water vapor, cigarette smoke, and exhaust gas using the big data.

The big data may include at least one of data corresponding to a probability of fire occurrence by date, data corresponding to a probability of fire occurrence by time, data corresponding to a probability of fire occurrence by space, data corresponding to a probability of fire occurrence by temperature, data corresponding to a probability of fire occurrence by humidity, data corresponding to a probability of fire occurrence by weather, data corresponding to a probability of fire occurrence by industry, and data corresponding to a probability of fire occurrence by user.

The non-fire alarm determination unit may determine validity of the fire detection signal based on values received from n sensing units (n is a positive integer) and the big data in a first situation, and determine the validity of the fire detection signal based on values received from m sensing units (m is a positive integer different from n) and the big data in a second situation different from the first situation.

The non-fire alarm determination unit may determine validity of the fire detection signal based on one of smoke, temperature, humidity, and gas detected by the plurality of sensing units in a first situation and the big data, and determine the validity of the fire detection signal based on the other one of smoke, temperature, humidity, and gas detected by the plurality of sensing units in a second situation different from the first situation and the big data.

The non-fire alarm determination unit may determine validity of the fire detection signal based on a first value detected by one of the plurality of sensing units in a first situation and the big data and determine validity of the fire detection signal based on a second value detected by one of the plurality of sensing units and the big data in a second situation different from the first situation, wherein a first criterion for determining that the non-fire alarm determination unit is a fire situation based on the first value in the first situation may be different from a second criterion for determining the fire situation based on the second value in the second situation.

The first server may further include a server memory configured to store information of parties corresponding to the address information, a server reception unit configured to receive the fire detection signal from the receiver, and a server transmission unit configured to transmit a warning message to the parties.

The non-fire alarm determination unit may calculate a fire occurrence probability based on the big data and values measured by each of the plurality of sensing units, wherein, when the fire probability is greater than or equal to a predetermined value, the server transmission unit may transmit a preliminary warning message to the parties.

The receiver may include a memory configured to store location information of each of the plurality of sensing units based on the address information, and a control unit configured to control each of the plurality of sensing units, wherein the non-fire alarm determination unit may receive the location information from the receiver and determine validity of the fire detection signal based on the location information.

A fire alarm apparatus with non-fire alarm prevention function according to an embodiment of the inventive concept includes a plurality of first sensing units each configured to detect at least one of smoke, temperature, humidity, and gas to generate a fire detection signal when it is determined to be a fire situation, and to perform Radio Frequency (RF) communication with each other, a first repeater configured to perform RF communication with the plurality of first sensing units, a plurality of second sensing units each configured to detect at least one of smoke, temperature, humidity, and gas to generate a fire detection signal when it is determined to be a fire situation, and to perform the RF communication with each other, a second repeater communicating with the plurality of second sensing units through the RF, a receiver communicating with the first repeater and the second repeater, and a first server configured to perform wireless communication with the receiver and determine the fire situation based on the fire detection signal, wherein the first server includes a big data reception unit configured to receive big data from an external second server, and a non-fire alarm determination unit configured to determine validity of the fire detection signal based on the big data and values detected by at least two neighboring sensing units among the plurality of sensing units.

Advantageous Effects

According to the inventive concept, big data may include fire-related data according to circumstances, and the non-fire alarm determination unit may determine validity of the fire detection signal based on the big data and values detected by each of the plurality of sensing units. Therefore, it is possible to make an optimal non-fire alarm determination for each situation, and the reliability of the non-fire alarm determination may be improved.

MODE FOR CARRYING OUT THE INVENTION

Figure 1:
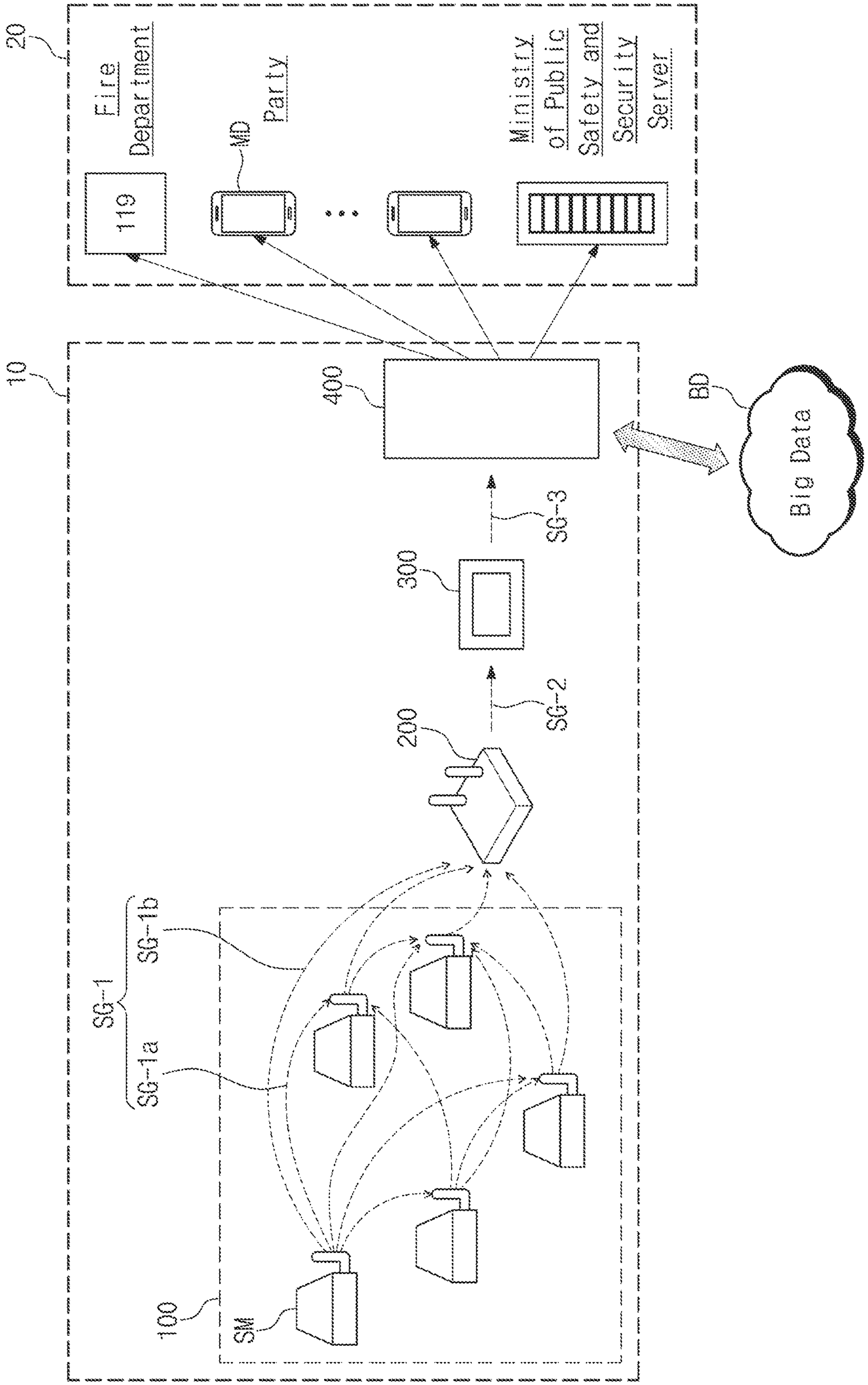
FIG. 1 shows a fire alarm apparatus having a non-fire alarm prevention function according to an embodiment of the inventive concept.

In this specification, when an element (or region, layer, part, etc.) is referred to as being "on", "connected to", or "coupled to" another element, it means that it may be directly placed on/connected to/coupled to other components, or a third component may be arranged between them.

Like reference numerals refer to like elements. Additionally, in the drawings, the thicknesses, proportions, and dimensions of components are exaggerated for effective description.

"And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the inventive concept. The terms of a singular form may include plural forms unless otherwise specified.

In addition, terms such as "below", "the lower side", "on", and "the upper side" are used to describe a relationship of components shown in the drawing. The terms are described as a relative concept based on a direction shown in the drawing.

Unless otherwise defined, all terms (including technical and scientific terms) used herein have the same meaning as commonly understood by one of ordinary skill in the art to which this inventive concept belongs. In addition, terms defined in a commonly used dictionary should be interpreted as having a meaning consistent with the meaning in the context of the related technology, and unless interpreted in an ideal or overly formal sense, the terms are explicitly defined herein.

In various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

Hereinafter, embodiments of the inventive concept will be described with reference to the drawings.

Figure 2:
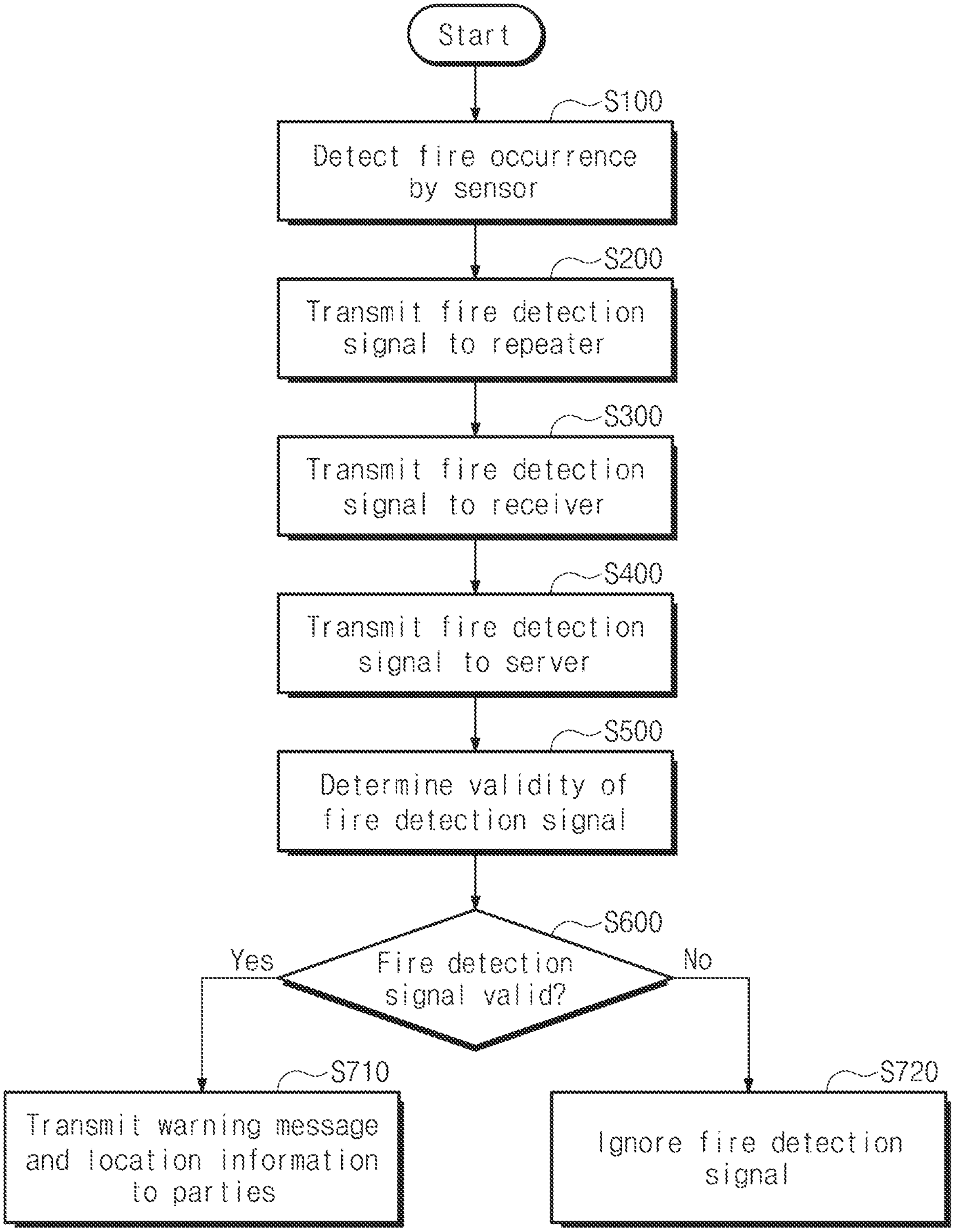
FIG. 2 is a flowchart illustrating a method of operating a fire alarm apparatus having a non-fire alarm prevention function according to an embodiment of the inventive concept.

FIG. 1 shows a fire alarm apparatus having a non-fire alarm prevention function according to an embodiment of the inventive concept, and FIG. 2 is a flowchart illustrating a method of operating a fire alarm apparatus having a non-fire alarm prevention function according to an embodiment of the inventive concept.

Referring to FIGS. 1 and 2, a fire alarm apparatus 10 having a non-fire alarm prevention function may include a sensing system 100, a repeater 200, a receiver 300, and a first server 400.

The sensing system 100 may be a system that detects whether a fire has occurred. The sensing system 100 may include a plurality of sensing units SM. In FIG. 1, five sensing units SM are shown as an example, but are not limited thereto.

Each of the plurality of sensing units SM may detect whether a fire occurs in S100. Each of the plurality of sensing units SM may transmit a first fire detection signal SG-1 to adjacent sensing units SM and/or a repeater 200 in S200.

The first fire detection signal SG-1 may include a first signal SG-1*a* and a second signal SG-1*b*. The first signal SG-1*a* may be a signal generated by the sensing unit SM detecting whether a fire has occurred. The second signal SG-1*b* may be a signal amplified by the sensing unit SM.

A radio frequency (RF) communication method may be used as a method of transmitting the first fire detection signal SG-1. The RF communication method may be a communication method for exchanging information by radiating a RF. The RF communication method is a broadband communication method using frequency, and may be less affected by climate and environment, and may have high stability. In the RF communication method, voice or other additional functions may be interlocked and the transmission speed may be high. For example, the RF communication method may use a frequency of 447 MHz to 924 MHz. However, this is exemplary and in an embodiment of the inventive concept, a communication method such as Ethernet, Wifi, LoRA, M2M, 3G, 4G, LTE, LTE-M, Bluetooth, or WiFi Direct may be used.

In an embodiment of the inventive concept, the RF communication method may include a Listen Before Transmission (LBT) communication method. This is a frequency selection method that determines whether the selected frequency is being used by another system and selects another frequency when it is determined that the selected frequency is occupied. For example, a node that intends to transmit may first listen to the medium, determine if it is in an idle state, and then flush the backoff protocol prior to transmission. By distributing data using this LBT communication method, collisions between signals in the same band may be prevented.

The repeater 200 may communicate with a plurality of sensing units SM. For example, the repeater 200 may communicate with 40 sensing units SM. The repeater 200 may receive a first fire detection signal SG-1 from the plurality of sensing units SM. The repeater 200 may convert the first fire detection signal SG-1 into a second fire detection signal SG-2. The repeater 200 may transmit a second fire detection signal SG-2 to the receiver 300 in S300.

The RF communication method may be used as a method of transmitting the second fire detection signal SG-2.

The receiver 300 may receive the second fire detection signal SG-2 from the repeater 200. The receiver 300 may convert the second fire detection signal SG-2 into a third fire detection signal SG-3. The receiver 300 may transmit a third fire detection signal SG-3 to the first server 400 in S400.

The RF communication method may be used as a method of transmitting the third fire detection signal SG-3.

The first server 400 may determine a fire situation based on the third fire detection signal SG-3 received from the receiver 300. The first server 400 may determine validity of the third fire detection signal SG-3 in S500.

The first server 400 may receive big data from an external second server BD. The big data may be stored in the memory of the second server BD. However, this is just an example and the big data according to an embodiment of the inventive concept may be stored in the memory of the first server 400.

The big data may include surrounding environment data for determining whether a fire has occurred. For example, the surrounding environment data may include at least one of data corresponding to the probability of fire occurrence by date, data corresponding to the probability of fire occurrence by time, data corresponding to the probability of fire occurrence by space, data corresponding to the probability of fire occurrence by temperature, data corresponding to the probability of fire occurrence by humidity, data corresponding to the probability of fire occurrence by weather, data corresponding to the fire occurrence probability for each type of business, and data corresponding to the fire occurrence probability for each user.

For example, the data corresponding to the fire occurrence probability for each date may include a fire occurrence probability for each day of the week and a fire occurrence probability for each month. The data corresponding to the fire occurrence probability by time may include the fire occurrence probability classified into dawn, morning, afternoon, evening, or late night. The data corresponding to the probability of occurrence of fire for each space may include the probability of occurrence of fire classified into urban areas, mountainous areas, beaches, rural areas, and the like. The data corresponding to the fire occurrence probability for each temperature may include a fire occurrence probability classified into spring, summer, autumn, or winter. The data corresponding to the fire occurrence probability for each humidity may include a fire occurrence probability for each specific humidity value. The data corresponding to the fire occurrence probability for each weather may include a fire occurrence probability classified as a sunny day, a cloudy day, or a rainy day. The data corresponding to the fire occurrence probability for each type of business may include a fire occurrence probability classified into a home, a restaurant, a factory, or an office. The fire occurrence probability for each user may include a fire occurrence probability classified by age, occupation, or gender.

The big data may be updated periodically.

The first server 400 may include an algorithm including an artificial intelligence model capable of determining a false alarm.

The first server 400 may determine the validity of the third fire detection signal SG-3 based on the big data and values detected by each of the plurality of sensing units SM based on different criteria for each situation in S600. For example, the first server 400 may use the big data to determine whether the values sensed by the plurality of sensing units SM are invalid data such as water vapor, cigarette smoke, and exhaust gas. This will be described later.

When the first server 400 determines the third fire detection signal SG-3 as a valid signal, it may transmit a warning message and location information to the plurality of parties 20 in S710.

The plurality of parties 20 may include, for example, a fire station, parties where a fire occurred, the Ministry of Public Safety and Security (or public institutions related to public safety), and the like. The plurality of parties 20 may receive the fire alarm message in the form of a text message, a video message, or a voice message through a landline phone, a smart phone, or other mobile terminal.

When the first server 400 determines that the third fire detection signal SG-3 is not valid, the third fire detection signal SG-3 may be ignored in S720. Therefore, non-fire alarm may be prevented. The non-fire alarm means that the fire alarm apparatus 10 operates by considering it as a fire even though it is not a fire.

In addition, when the first server 400 determines the third fire detection signal SG-3 as an invalid signal, the first server 400 may transmit a control signal to the plurality of sensing units SM to prevent the alarms of the plurality of sensing units SM from sounding.

Figure 3:
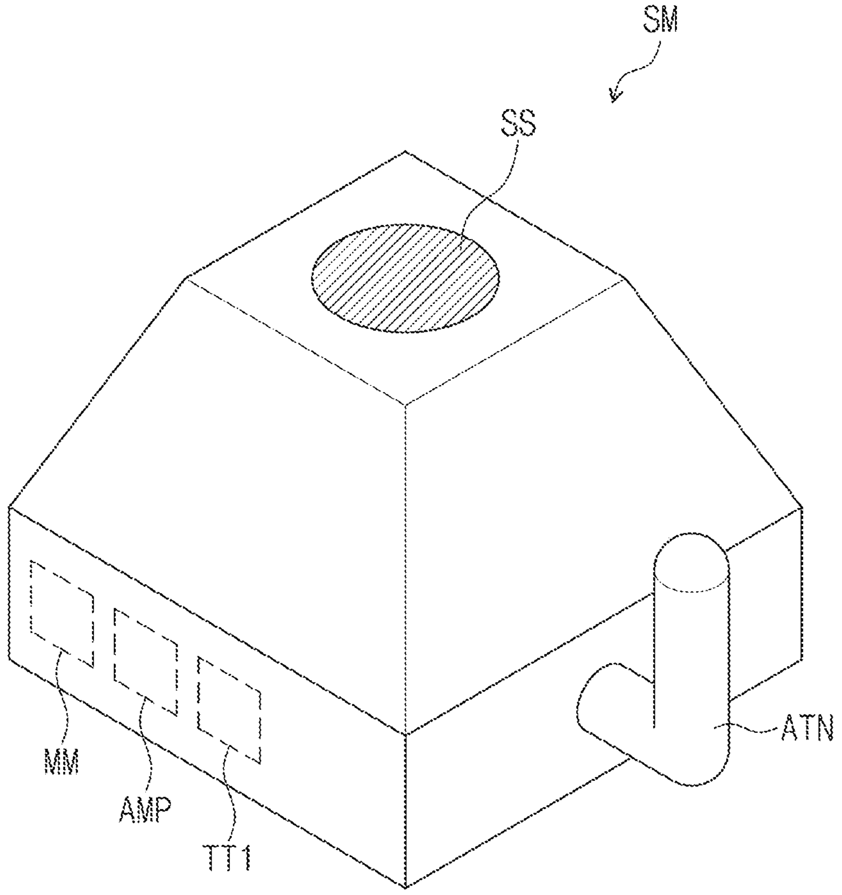
FIG. 3 is a perspective view illustrating one sensing unit among a plurality of sensing units according to an embodiment of the inventive concept.

FIG. 3 is a perspective view illustrating one sensing unit among a plurality of sensing units according to an embodiment of the inventive concept.

Referring to FIGS. 1 and 3, each of the plurality of sensing units SM may include different unique address information. Each of the plurality of sensing units SM may include a sensor SS, a sensing memory MM, an amplification unit AMP, a communication unit ATN, and a battery unit TT1.

The sensor SS may detect at least one of smoke, temperature, humidity, and gas. The sensor SS may generate fire information by sensing at least one of smoke, temperature, humidity, and gas. The fire information may include a value measured by the sensor SS. In FIG. 3, one sensor SS is illustrated by way of example, but the inventive concept is not limited thereto. For example, each of the plurality of sensing units SM may include a plurality of sensors, and each of the plurality of sensors may detect at least one of smoke, temperature, humidity, and gas.

The sensing memory MM may store information on the sensor SS. The sensing unit SM may automatically determine a modulation method for a signal generated by the mounted sensor SS through information stored in the sensing memory MM. Through such an automatic modulation method, the sensing unit SM may be set to a state in which the first fire detection signal SG-1 may be easily transmitted even if any type of sensors are mounted on each of the plurality of sensing units SM.

The address information may be stored in the sensing memory MM. An optimal signal transmission path for rapidly transmitting the first fire detection signal SG-1 to the repeater 200 may be stored in the sensing memory MM.

The sensing memory MM may include a volatile memory or a non-volatile memory. The volatile memory may include DRAM, SRAM, flash memory, or FeRAM. The non-volatile memory may include SSD or HDD.

The communication unit ATN may transmit a first fire detection signal SG-1 to the repeater 200. The communication unit ATN may also transmit the first fire detection signal SG-1 to other adjacent sensing units SM. The first fire detection signal SG-1 may include the fire information and the address information generated by the sensor SS.

When receiving a fire start signal from the sensor SS, the communication unit ATN may transmit the first signal SG-1*a* to the repeater 200. When receiving the fire occurrence signal from the sensor SS, the communication unit ATN may transmit the first signal SG-1*a* to at least one of the plurality of adjacent sensing units SM.

When the sensing unit SM and the repeater 200 are far apart from each other and it is difficult for the repeater 200 to directly receive the first fire detection signal SG-1, the communication unit ATN may stably transmit the signal to the repeater 200 by transmitting the first fire detection signal SG-1 to another adjacent sensing unit SM. The communication unit ATN may receive the first fire detection signal SG-1 from another adjacent sensing unit SM.

The amplification unit AMP may amplify and convert the first signal SG-1*a* into the second signal SG-1*b*.

The communication unit ATN may receive the first signal SG-1*a* from another sensing unit SM. In the process of receiving the received first signal SG-1*a* from another adjacent sensing unit SM, the transmission rate and/or accuracy may be deteriorated due to the transmission distance and noise. The amplification unit AMP may amplify and convert the first signal SG-1*a* having a degraded quality into a second signal SG-1*b*. The transmission rate and/or accuracy of the second signal SG-1*b* may be improved. The communication unit ATN may transmit the second signal SG-1*b* to the repeater 200. The communication unit ATN may transmit the second signal SG-1*b* to at least one of the plurality of adjacent sensing units SM. The second signal SG-1*b* may increase accuracy, transmission rate, and transmission distance of a signal transmitted between the plurality of sensing units SM and the repeater 200.

The second signal SG-1*b* according to an embodiment of the inventive concept may be transmitted to another adjacent sensing unit SM and amplified again in the amplification unit AMP of the other adjacent sensing unit SM.

According to the inventive concept, the plurality of sensing units SM may stably transmit data to the plurality of sensing units SM and the repeater 200 using the amplification unit AMP. Accordingly, reliability of the plurality of sensing units SM may be improved.

The battery unit TT1 may supply power to the sensor SS, the sensing memory MM, the amplification unit AMP, and the communication unit ATN.

The communication unit ATN according to an embodiment of the inventive concept may use an RF communication method. The RF communication method may consume less power. Power use of the sensing unit SM may be minimized, and the sensing unit SM may be driven with low power. Accordingly, the battery unit TT1 may stably supply power to the sensor SS, the sensing memory MM, the amplification unit AMP, and the communication unit ATN for a long time.

Also, according to the inventive concept, the plurality of sensing units SM may operate in a power saving mode that does not consume power and a normal mode that operates in a fire situation separately, thereby minimizing power consumption of each of the plurality of sensing units SM. Accordingly, each of the plurality of sensing units SM may be driven with low power.

Figure 4:
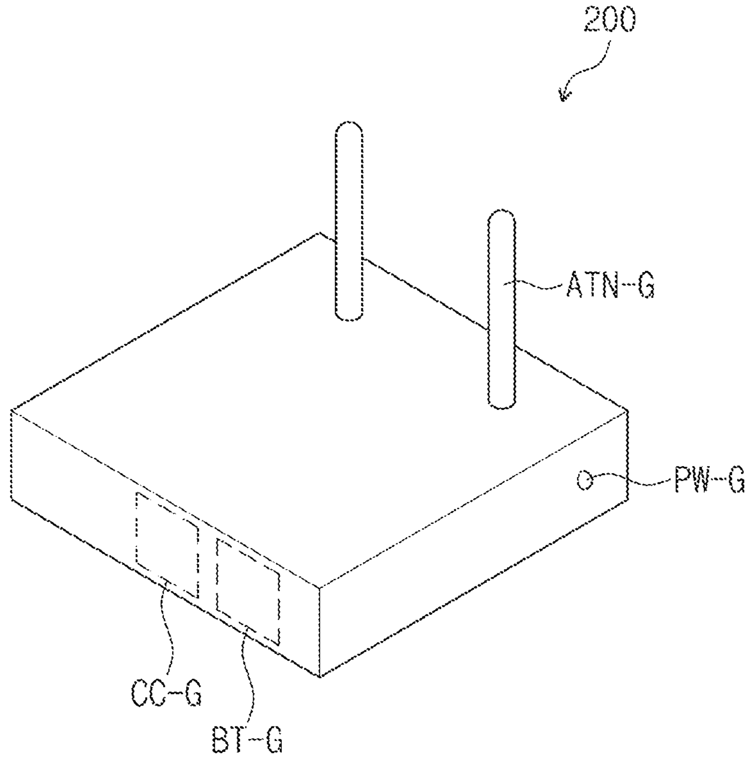
FIG. 4 is a perspective view illustrating a repeater according to an embodiment of the inventive concept.

FIG. 4 is a perspective view illustrating a repeater according to an embodiment of the inventive concept.

Referring to FIGS. 1 and 4, the repeater 200 may communicate with a plurality of sensing units SM. For example, the repeater 200 may communicate with 40 sensing units SM. The repeater 200 may include a communication unit ATN-G, a power supply unit PW-G, a battery unit BT-G, and a control unit CC-G.

The communication unit ATN-G may communicate with the plurality of sensing units SM and the receiver 300. The communication unit ATN-G may receive a first fire detection signal SG-1 from each of the plurality of sensing units SM. The communication unit ATN-G and each communication unit ATN (see FIG. 3) of the plurality of sensing units SM may wirelessly communicate through an RF communication method. The communication unit ATN-G may transmit a second fire detection signal SG-2 to the receiver 300. The communication unit ATN-G and the communication unit ATN-R (see FIG. 5) of the receiver 300 may communicate wirelessly through an RF communication method.

The power supply unit PW-G may receive first power from the outside. The first power may supply power to the communication unit ATN-G and the control unit CC-G.

The battery unit BT-G may supply second power. The second power may supply power to the communication unit ATN-G and control unit CC-G.

According to the inventive concept, the battery unit BT-G may supply the second power even if the first power supplied from the power supply unit PW-G is cut off so that the repeater 200 may operate. The repeater 200 may stably receive the first fire detection signal SG-1 from the plurality of sensing units SM and stably transmit the second fire detection signal SG-2 to the receiver 300. Accordingly, reliability of signal transmission may be improved.

The control unit CC-G may convert the first fire detection signal SG-1 into a second fire detection signal SG-2. When the first power is not supplied from the power supply unit PW-G to the communication unit ATN-G, the control unit CC-G may supply the second power from the battery unit BT-G to the communication unit ATN-G.

Figure 5:
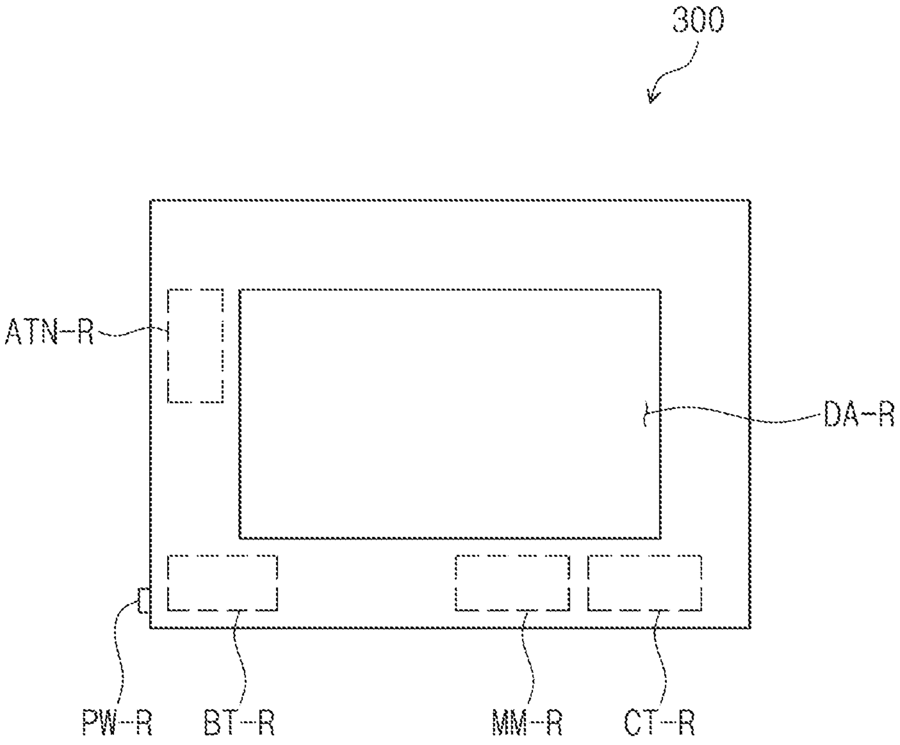
FIG. 5 illustrates a receiver according to an embodiment of the inventive concept.

FIG. 5 illustrates a receiver according to an embodiment of the inventive concept.

Referring to FIGS. 1 and 5, the receiver 300 may receive a second fire detection signal SG-2 from the plurality of repeaters 200. For example, the receiver 300 may communicate with 24 repeaters 200. That is, the receiver 300 may communicate with 960 sensing units SM.

The receiver 300 may include a communication unit ATN-R, a power supply unit PW-R, a battery unit BT-R, a memory MM-R, a control unit CT-R, and a display unit DA-R.

The communication unit ATN-R may communicate with the repeater 200 and the first server 400. The communication unit ATN-R may receive the second fire detection signal SG-20 from the repeater 200. The communication unit ATN-R and the communication unit ATN-G (see FIG. 4) of the repeater 200 may communicate wirelessly through an RF communication scheme. The communication unit ATN-R may transmit a third fire detection signal SG-3 to the first server 400. The communication unit ATN-R and the server transmission unit ATN-B of the first server 400 (see FIG. 6) may communicate wirelessly through an RF communication method.

The power supply unit PW-R may receive first power from the outside. The first power may supply power to the communication unit ATN-R, the memory MM-R, the control unit CT-R, and the display unit DA-R.

The battery unit BT-R may supply second power. The second power may supply power to the communication unit ATN-R, the memory MM-R, the display unit DA-R, and the control unit CT-R.

According to the inventive concept, the battery unit BT-R may supply the second power even if the first power supplied from the power supply unit PW-R is cut off so that the receiver 300 may operate. The receiver 300 may stably receive the second fire detection signal SG-2 from the repeater 200 and stably transmit the third fire detection signal SG-3 to the first server 400. Accordingly, reliability of signal transmission may be improved.

Address information of each of the plurality of sensing units SM may be stored in the memory MM-R. Location information of each of the plurality of sensing units SM may be stored in the memory MM-R based on the address information.

The display unit DA-R may provide image information corresponding to the state of the plurality of sensing units SM or the state of the repeater 200. The display unit DA-R may include a liquid crystal display panel or an organic light emitting display panel. The display unit DA-R may receive an external input provided by the user. For example, the display unit DA-R may further include a touch unit.

The control unit CT-R may control each of the plurality of sensing units SM. A user may provide an input to the display unit DA-R so that the control unit CT-R controls each of the plurality of sensing units SM. For example, the control unit CT-R may control information on the place where each of the plurality of sensing units SM is disposed, information on the type of value detected by each of the plurality of sensing units SM and/or information on whether each of the plurality of sensing units SM is normally operating.

The receiver 300 may control a plurality of sensing units SM disposed in various places through the repeater 200.

Figure 6:
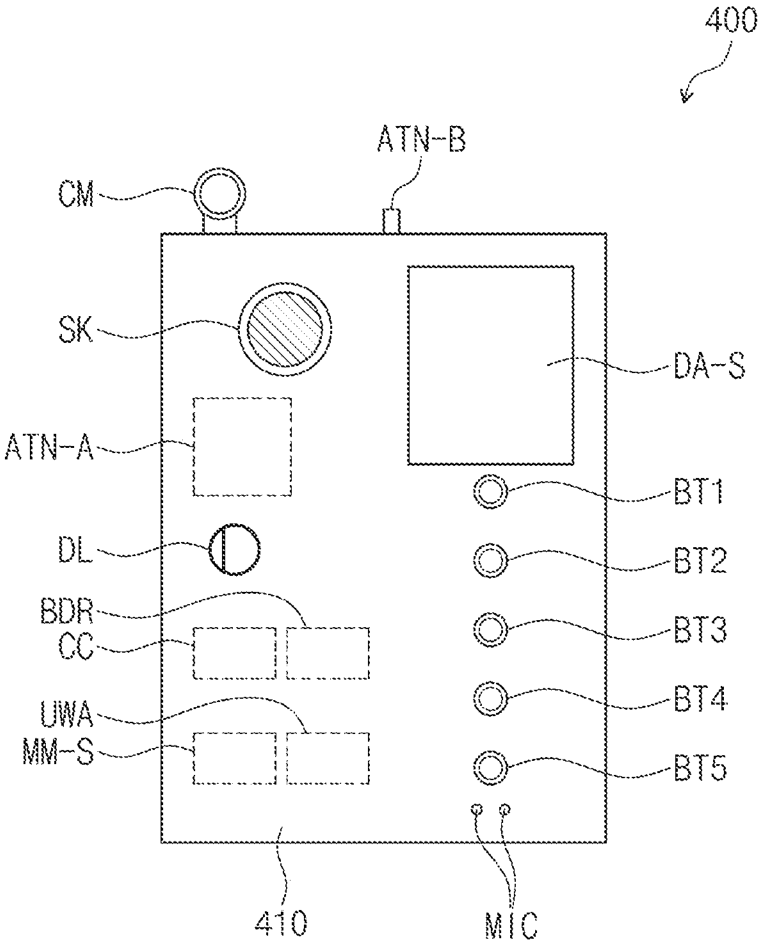
FIG. 6 illustrates a first server according to an embodiment of the inventive concept.

FIG. 6 illustrates a first server according to an embodiment of the inventive concept.

Referring to FIGS. 1 and 6, the first server 400 may include a server reception unit ATN-A, a control unit CC (or control circuit), a server memory MM-S, a server transmission unit ATN-B, a display unit DA, a speaker SK, a microphone MIC, a camera CM, first to fifth buttons BT1, BT2, BT3, BT4, and BT5, a door lock DL, a big data reception unit BDR, and a non-fire alarm determination unit UWA.

The server reception unit ATN-A may receive the third fire detection signal SG-3 transmitted by the receiver 300.

The control unit CC may control the plurality of sensing units SM, the repeater 200, and the receiver 300, and identify fire information and address information included in the third fire detection signal SG-3.

If the identified address information is the same as the previously identified address information, the control unit CC may control the first server 400 to ignore the third fire detection signal SG-3. In relation to the control unit CC, if the identified address information is different from the previously identified address information, the first server 400 may transmit a warning message to parties corresponding to the address information found in the server memory MM-S. Through such control, it is possible to prevent the warning message from repeatedly transmitting the same message to the parties 20.

Information (e.g., contact information, addresses, or names) of the parties 20 may be stored in the server memory MM-S. Information of the parties 20 stored in the server memory MM-S may be matched with address information of each of the plurality of sensing units SM.

The server memory MM-S may include a volatile memory or a non-volatile memory. Volatile memory may include DRAM, SRAM, flash memory, or FeRAM. Non-volatile memory may include SSD or HDD.

The server transmission unit ATN-B may transmit a fire alarm message to the parties 20. The first server 400 may transmit a fire alarm message to the parties 20 corresponding to the identified address information among the information of the parties 20 stored in the server memory MM-S. At this time, the parties 20 corresponding to the identified address information may include the owner of the place where the fire occurred, the family of the owner of the place where the fire occurred, the owner of the place adjacent to the place where the fire occurred, the fire department having jurisdiction, or a public institution concerned.

The server transmission unit ATN-B may transmit a reception signal indicating that the third fire detection signal SG-3 has been received to the receiver 300. Upon receiving the received signal, the receiver 300 may determine that the transmitted third fire detection signal SG-3 has been properly delivered to the first server 400.

The server transmission unit ATN-B may transmit information in a Wideband Code Division Multiple Access (WCDMA) communication method. WCDMA is stronger in frequency selective fading as the bandwidth increases, and the bandwidth increases when the same data is transmitted, and since the processing gain is increased, the corresponding amount of interference may be reduced and the capacity may be increased. In addition, since multipath may be resolved, propagation delay in an indoor environment may be overcome even in the case of microcells. Therefore, WCDMA may be effective in transmitting a fire alarm message in a fire situation in which a stable message must be transmitted quickly due to an urgent situation. And it has excellent bandwidth efficiency per 1 MHz bandwidth, which is advantageous in terms of subscriber capacity, and by reducing the capacity of the power amplifier by increasing the processing gain, the implementation cost may be reduced, and by reducing the size of the power amplifier, the power consumption and size of the terminal may be reduced.

The display unit DA may provide image information corresponding to the state of the receiver 300 or the state of the plurality of sensing units SM. The display unit DA may include a liquid crystal display panel or an organic light emitting display panel.

The speaker SK may emit an alarm sound when the first server 400 receives the third fire detection signal SG-3.

The microphone MIC may recognize the voice of a user in the vicinity of the first server 400. The microphone MIC may be used to recognize a user's voice command in an emergency situation. In this case, the first server 400 may contain a program or system for recognizing a user's voice command.

The camera CM may detect and/or recognize a user's movement around the first server 400.

The user may manually report a fire by pressing the first button BT1 or by applying a touch to the fire department. In the initial fire stage before the plurality of sensing units SM detects whether or not there is a fire, when people around the first server 400 discover a fire, they may quickly report the fire.

The user may stop generating the alarm sound from the speaker SK by pressing the second button BT2 or applying a touch.

The user may communicate (or call) with an external communication device by pressing the third button BT3 or applying a touch. After the user presses the third button BT3, the user may transmit voice information to the other party through the microphone MIC and receive voice information from the other party through the speaker SK.

The user may check the states of the plurality of sensing units SM, the repeater 200, and the receiver 300 by pressing the fourth button BT4 or applying a touch. For example, although no fire has occurred, the first server 400 receives a virtual third fire detection signal SG-3 from the receiver 300 and the first server 400 may transmit a warning message to at least one of the parties 20. In this way, it is possible to check whether the fire alarm apparatus 10 according to an embodiment of the inventive concept operates normally.

In addition, the first server 400 may transmit an operation check signal to each of the plurality of sensing units SM. Each of the plurality of sensing units operating in a power saving mode may receive an operation check signal and operate in a normal mode. At this time, each of the plurality of sensing units may transmit a communication operating state to the first server 400 through the repeater 200 and the receiver 300 and then operate in a power saving mode.

The user may initialize the signal transmission path stored in the sensor memory MM (see FIG. 3) of each of the plurality of sensing units SM by pressing the fifth button BT5 or applying a touch.

The user may open the outer case of the first server 400 using the door lock DL. After opening the outer case, the built-in parts may be easily inspected.

A big data reception unit BDR may receive big data from an external second server BD. The big data may be used as data for determining whether a fire has occurred.

A big data reception unit BDR may include a learning model for determining whether a fire has occurred by machine learning the big data.

Based on the big data and the value detected by each of the plurality of sensing units SM, the non-fire alarm determination unit UWA may determine the validity of the third fire detection signal SG-3 based on different criteria for each situation. For example, the non-fire alarm determination unit UWA uses the big data to determine whether the values detected by each of the plurality of sensing units SM are invalid data such as water vapor, cigarette smoke, and exhaust gas.

The non-fire alarm determination unit UWA calculates the probability of fire occurrence based on the big data and the values measured by each of the plurality of sensing units SM, and when the fire occurrence probability is greater than a predetermined value (e.g., 80%), even if each of the plurality of sensing units SM does not detect the occurrence of a fire, a warning sound may be generated through the speaker SK.

In one embodiment of the inventive concept, the fire alarm apparatus 10 calculates the probability of fire occurrence using the big data, and if it is determined that the probability of fire occurrence is high, the fire alarm apparatus 10 may be used as a pre-awareness type fire alarm apparatus that warns in advance before a fire occurs.

The non-fire alarm determination unit UWA may receive location information of each of the plurality of sensing units SM from the receiver 300, and determine the validity of the third fire detection signal SG-3 based on the location information.

The non-fire alarm determination unit UWA may calculate the probability of fire occurrence based on the big data and the values measured by each of the plurality of sensing units SM, and when the fire occurrence probability is greater than or equal to a predetermined value, the server transmission unit ATN-B may transmit a preliminary warning message to the parties 20.

Although not shown, the first server 400 may include a separate battery therein. In addition, the first server 400 may include a function of recording and notifying parties of the corresponding information when power supply applied thereto is interrupted.

Figure 7:
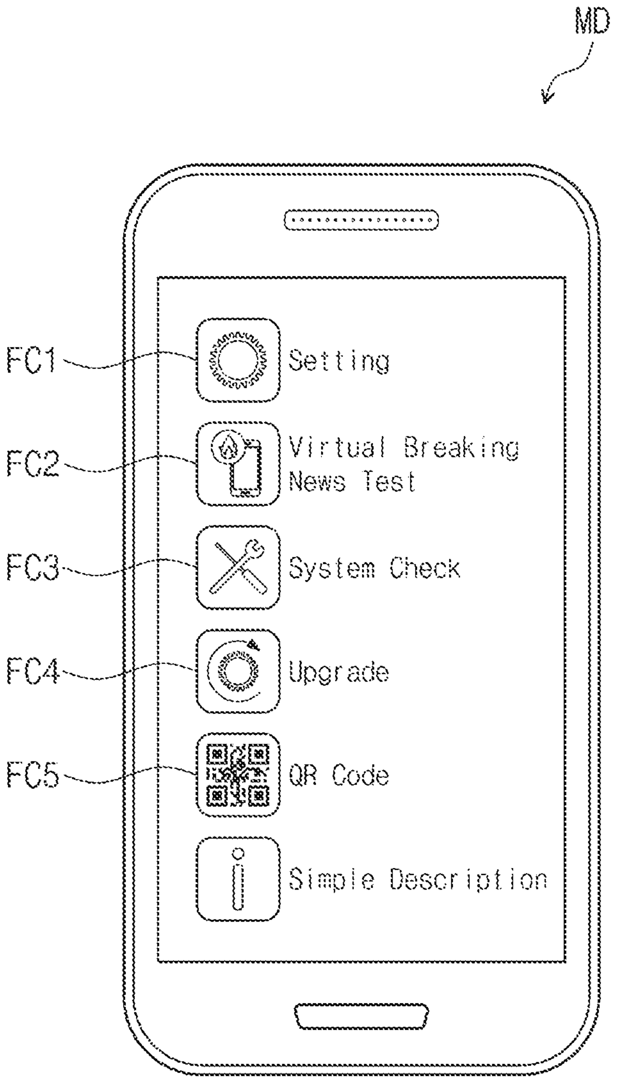
FIG. 7 illustrates a terminal of a party according to an embodiment of the inventive concept.

FIG. 7 illustrates a terminal of a party according to an embodiment of the inventive concept.

Referring to FIGS. 1 and 7, the terminal MD may include a smart phone, a desktop computer, a laptop computer, a tablet PC, or a wearable device. However, this is exemplary and the terminal MD of the inventive concept may include various devices capable of communication. FIG. 7 illustrates a smart phone as an example of a terminal MD of a party.

The party may remotely control the plurality of sensing units SM, the repeater 200, the receiver 300, or the first server 400 using the terminal MD. At this time, the terminal MD may transmit a control signal to the plurality of sensing units SM, the repeater 200, the receiver 300, or the first server 400.

The functions FC1, FC2, FC3, and FC4 that may be controlled using the terminal MD may include the first function FC1, the second function FC2, the third function FC3, and the fourth function FC4.

The first function FC1 may be a setting function. The party 20 may input the serial number of each of the plurality of sensing units using the first function FC1, or input information (contact information) of the parties 20 to receive the fire alarm message, or input the address of a place where each of the plurality of sensing units is installed.

The second function FC2 may be a virtual breaking news test function. The party 20 may remotely check whether the first server 400 normally transmits the fire alarm message by using the second function FC2.

The third function FC3 may be a system check function. The party 20 (see FIG. 1) may check the operation status (e.g., whether power is normally being applied, etc.) of the plurality of sensing units SM, the repeater 200, the receiver 300, or the first server 400 using the third function FC3.

The fourth function FC4 may be an upgrade function. The party 20 remotely may check the firmware versions of the plurality of sensing units SM, the repeater 200, the receiver 300, or the first server 400 using the terminal MD, and upgrade the firmware, and the like.

Figure 8A:
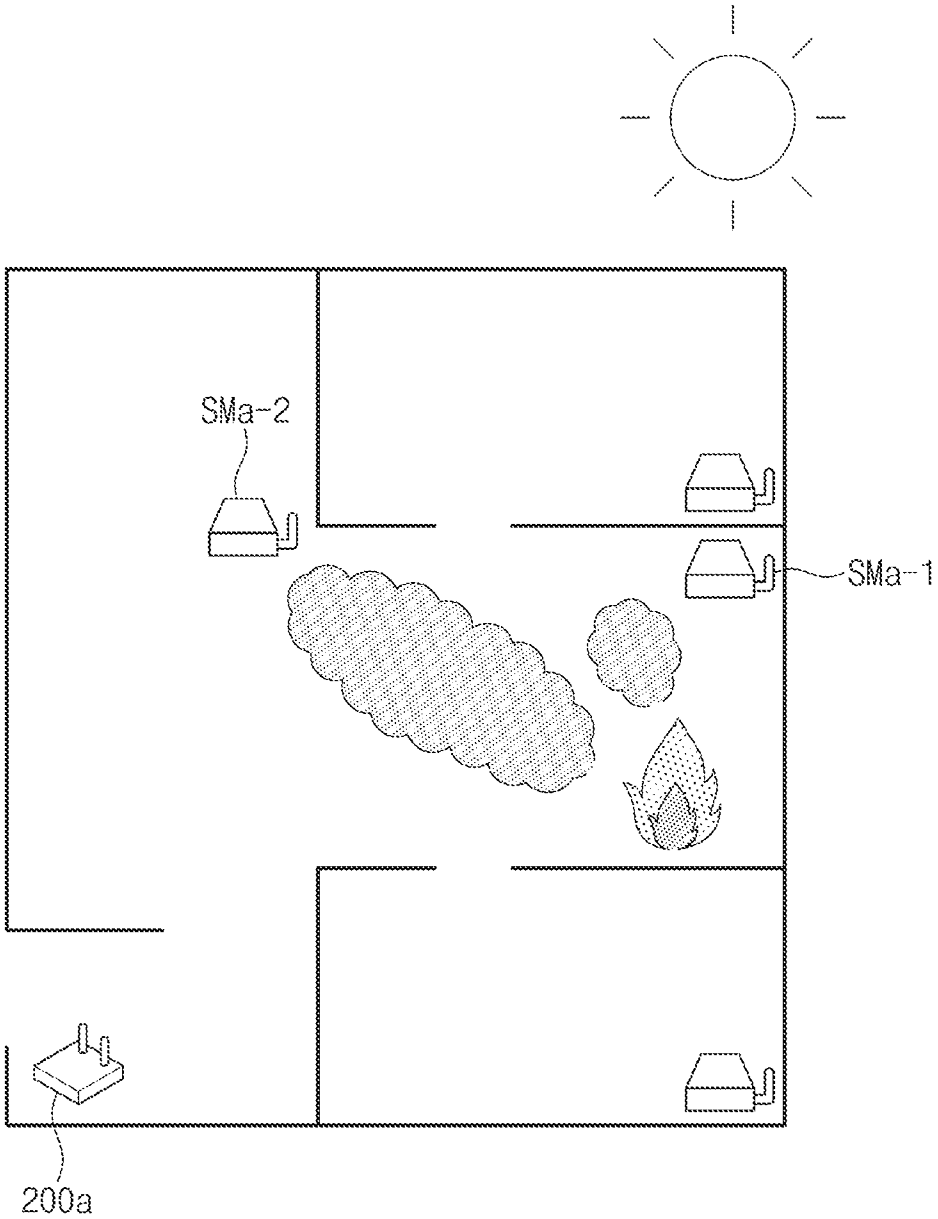
FIGS. 8A and 8B illustrate the operation of a fire alarm apparatus according to an embodiment of the inventive concept.
Figure 8B:
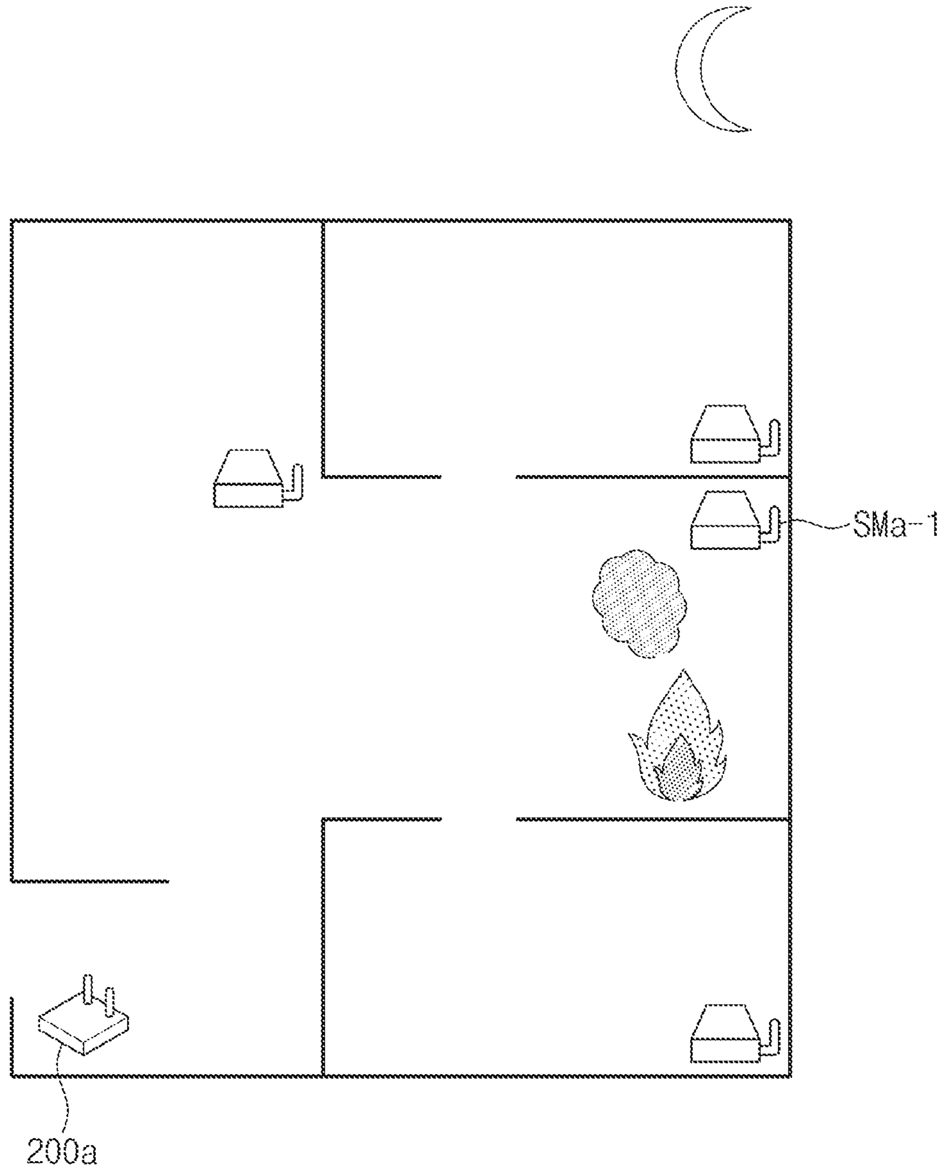

FIGS. 8A and 8B illustrate the operation of a fire alarm apparatus according to an embodiment of the inventive concept.

Referring to FIGS. 1, 6, 8A, and 8B, the fire alarm apparatus 10 having a non-fire alarm prevention function may be installed and used in a building. However, this is an example, and the fire alarm apparatus 10 according to an embodiment of the inventive concept may be installed and used in various places where a fire may occur. For example, the fire alarm apparatus 10 may be installed and used in public transportation.

A plurality of sensing units SM may be respectively disposed in rooms and corridors of a building. The plurality of sensing units SM may be arranged at regular intervals from each other to respond according to circumstances in the event of a fire.

The big data reception unit BDR may receive big data corresponding to the fire occurrence probability by time from an external second server BD.

FIG. 8A shows the day time zone, and FIG. 8B shows the night time zone. The day time zone may be referred to as a first situation, and the night time zone may be referred to as a second situation.

There is a high possibility of using a fire in a restaurant or kitchen in the day time zone, and using a fire may cause smoke or increase the temperature so that there is a possibility that the plurality of sensing units SM senses the occurrence of smoke or a rise in temperature even though it is not a fire situation and misjudges it as a fire situation. A non-fire alarm may occur due to the misjudgment. However, the non-fire alarm determination unit UWA according to an embodiment of the inventive concept may receive data indicating that a fire situation may be misjudged in the day time zone through the big data, and determine validity of the third fire detection signal SG-3 by correcting the reference according to the situation of the day time zone.

That is, the non-fire alarm determination unit UWA may determine validity of the third fire detection signal SG-3 based on the value received from n sensing units (n is a positive integer) and the big data. For example, in the day time zone, each of the first sensing unit SMa-1 and the second sensing unit SMa-2 may detect smoke generated in a building. A first fire detection signal SG-1 may be generated based on values detected by each of the first sensing unit SMa-1 and the second sensing unit SMa-2 and transmitted to the repeater 200*a*. The repeater 200*a* may transmit a second fire detection signal SG-2 generated based on the first fire detection signal SG-1 to the receiver 300, and the receiver 300 may transmit a third fire detection signal SG-3 generated based on the second fire detection signal SG-2 to the first server 400. The non-fire alarm determination unit UWA may determine validity of the third fire detection signal SG-3 based on the values detected by each of the first sensing unit SMa-1 and the second sensing unit SMa-2 and the big data.

According to the inventive concept, the big data may include data indicating that fire may be used in a restaurant or kitchen in a day time zone, and the non-fire alarm determination unit UWA may determine validity of the third fire detection signal SG-3 based on the big data and values detected by each of the plurality of sensing units SM. Therefore, an optimal non-fire alarm determination may be made for each situation, and the reliability of the non-fire alarm determination may be improved.

In the night time zone, the possibility of using fire in the building is low, and the possibility of smoke generation or temperature rise is also low. Therefore, if a non-fire alarm is determined by applying the same criteria as the day time zone, the fire situation may be misjudged as a non-fire situation. However, the non-fire alarm determination unit UWA according to an embodiment of the inventive concept may receive data indicating that a fire situation may be misjudged in the night time zone through the big data, and determine the validity of the third fire detection signal SG-3 by correcting the criterion for non-fire alarm determination according to the situation of the night time zone.

That is, the non-fire alarm determination unit UWA may determine validity of the third fire detection signal SG-3 based on the value received from m sensing units (m is a positive integer different from n) and the big data. The n may be greater than the m. For example, in a night time zone, the first sensing unit SMa-1 may detect smoke generated in a building. Based on the value detected by the first sensing unit SMa-1, a first fire detection signal SG-1 may be generated and transmitted to the repeater 200*a*. The repeater 200*a* may transmit a second fire detection signal SG-2 generated based on the first fire detection signal SG-1 to the receiver 300, and the receiver 300 may transmit a third fire detection signal SG-3 generated based on the second fire detection signal SG-2 to the first server 400. The non-fire alarm determination unit UWA may determine validity of the third fire detection signal SG-3 based on the value detected by one first sensing unit SMa-1 and the big data.

According to the inventive concept, the big data may include data indicating that fire is not used in the building in the night time zone, and the non-fire alarm determination unit UWA may determine validity of the third fire detection signal SG-3 based on the big data and the value detected by the first sensing unit SMa-1. Therefore, an optimal non-fire alarm determination may be made for each situation, and the reliability of the non-fire alarm determination may be improved.

FIGS. 8A and 8B show that one sensing unit is disposed in one area, but the embodiment of the inventive concept is not limited thereto, and a plurality of sensing units that measure different values of smoke, temperature, humidity, and gas may be disposed in one area. That is, the non-fire alarm determination unit UWA may determine validity of the third fire detection signal SG-3 based on the big data and values detected by at least two sensing units adjacent to each other among the plurality of sensing units SM.

Figure 9A:
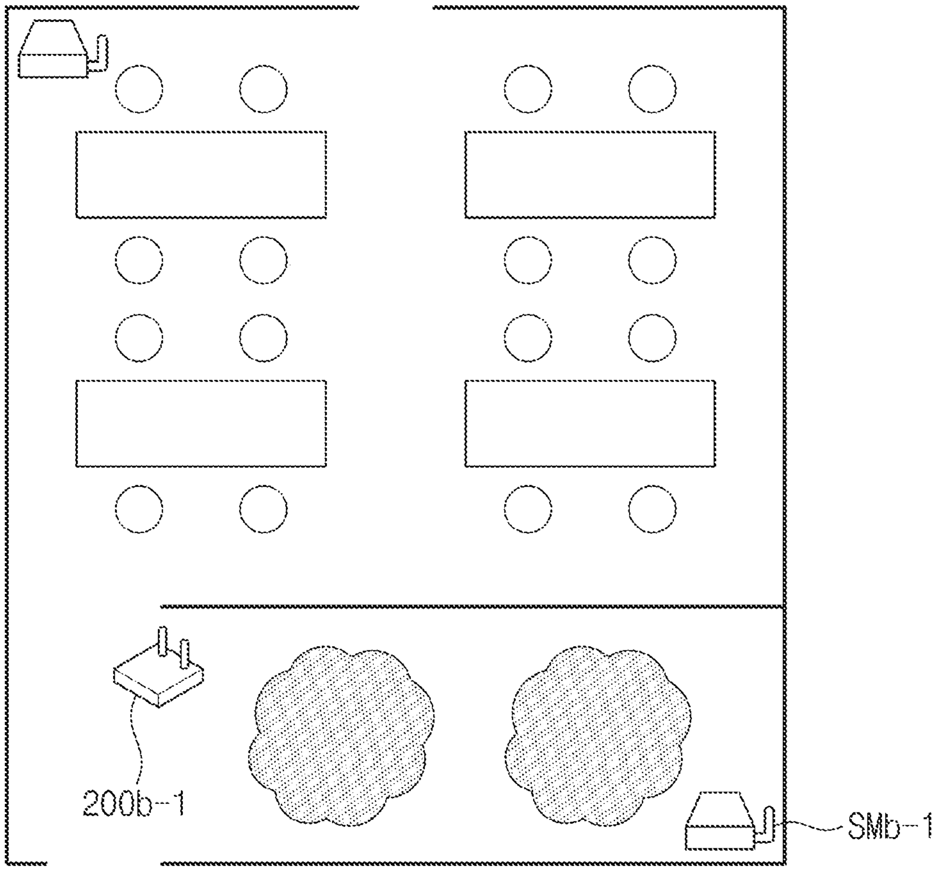
FIGS. 9A and 9B illustrate the operation of a fire alarm apparatus according to an embodiment of the inventive concept.
Figure 9B:
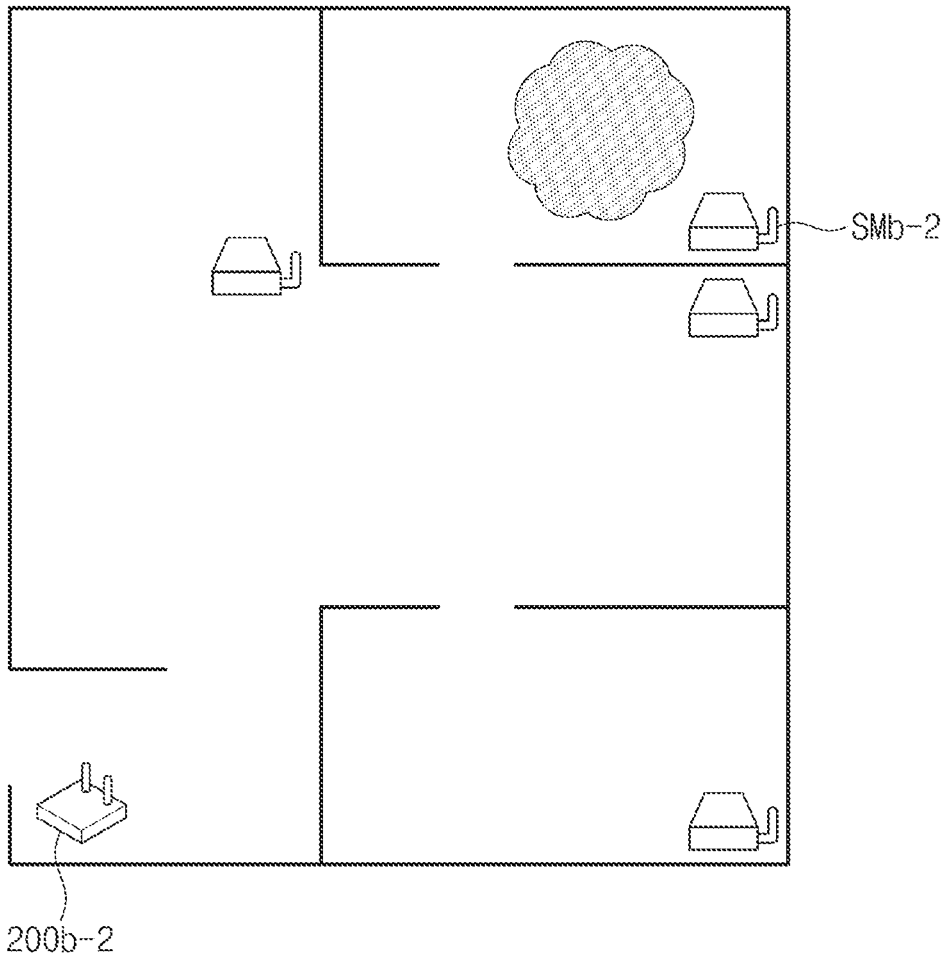

FIGS. 9A and 9B illustrate the operation of a fire alarm apparatus according to an embodiment of the inventive concept.

Referring to FIGS. 1, 6, 9A, and 9B, the fire alarm apparatus 10 having a non-fire alarm prevention function may be installed and used in a building.

The big data reception unit BDR may receive data corresponding to a fire occurrence probability for each space from an external second server BD.

FIG. 9A shows a restaurant where fire is often used, and FIG. 9B shows an apartment where fire is not often used. The restaurant may be referred to as a first space or a first situation, and the apartment may be referred to as a second space or a second situation.

Restaurants are likely to use fire, which may cause smoke. There is a possibility that the plurality of sensing units SM senses the occurrence of smoke even though it is not a fire situation and misjudges it as a fire situation. Anon-fire alarm may occur due to the misjudgment. However, the non-fire alarm determination unit UWA according to an embodiment of the inventive concept may receive data indicating that a fire situation may be misjudged in a space using fire through the big data, and determine the validity of the third fire detection signal SG-3 by correcting the reference according to the situation of the space where the plurality of sensing units SM are disposed.

That is, the non-fire alarm determination unit UWA may determine validity of the third fire detection signal SG-3 based on one of the smoke, temperature, humidity, and gas detected by the plurality of sensing units SM and the big data. For example, in a restaurant where smoke is highly likely to occur, the first sensing unit SMb-1 may detect one of humidity and gas other than smoke. Based on the value detected by the first sensing unit SMb-1, a first fire detection signal SG-1 may be generated and transmitted to the repeater 200*b*-1. The repeater 200*b*-1 may transmit a second fire detection signal SG-2 generated based on the first fire detection signal SG-1 to the receiver 300, and the receiver 300 may transmit a third fire detection signal SG-3 generated based on the second fire detection signal SG-2 to the first server 400. The non-fire alarm determination unit UWA may determine validity of the third fire detection signal SG-3 based on the value detected by the first sensing unit SMb-1 and the big data.

According to the inventive concept, the big data may include data indicating that smoke may be generated by using fire in a restaurant, and the non-fire alarm determination unit UWA may determine validity of the third fire detection signal SG-3 based on the big data and values detected by each of the plurality of sensing units SM. Therefore, an optimal non-fire alarm determination may be made for each situation, and the reliability of the non-fire alarm determination may be improved.

It is unlikely to use a fire in an apartment, and it is also unlikely that smoke will occur or the temperature will rise. Therefore, if the non-fire alarm is determined by applying the same criteria as the restaurant, the fire situation may be misjudged as a non-fire situation. However, the non-fire alarm determination unit UWA according to an embodiment of the inventive concept may receive data indicating that a fire situation may be misjudged in an apartment through the big data, and determine the validity of the third fire detection signal SG-3 by correcting the criterion of non-fire alarm determination according to the situation of the apartment.

That is, the non-fire alarm determination unit UWA may determine validity of the third fire detection signal SG-3 based on the big data and one different from that selected in the first situation among smoke, temperature, humidity, and gas detected by the plurality of sensing units SM. For example, in an apartment where smoke is unlikely to occur, the first sensing unit SMb-2 may detect at least one of smoke and temperature. Based on the value detected by the first sensing unit SMb-2, a first fire detection signal SG-1 may be generated and transmitted to the repeater 200*b*-2. The repeater 200*b*-2 may transmit a second fire detection signal SG-2 generated based on the first fire detection signal SG-1 to the receiver 300, and the receiver 300 may transmit a third fire detection signal SG-3 generated based on the second fire detection signal SG-2 to the first server 400. The non-fire alarm determination unit UWA may determine validity of the third fire detection signal SG-3 based on the value detected by the first sensing unit SMb-2 and the big data.

According to the inventive concept, the big data may include data indicating that smoke may be generated by using fire in a restaurant, and the non-fire alarm determination unit UWA may determine validity of the third fire detection signal SG-3 based on the big data and values detected by each of the plurality of sensing units SM. Therefore, an optimal non-fire alarm determination may be made for each situation, and the reliability of the non-fire alarm determination may be improved.

Figure 10:
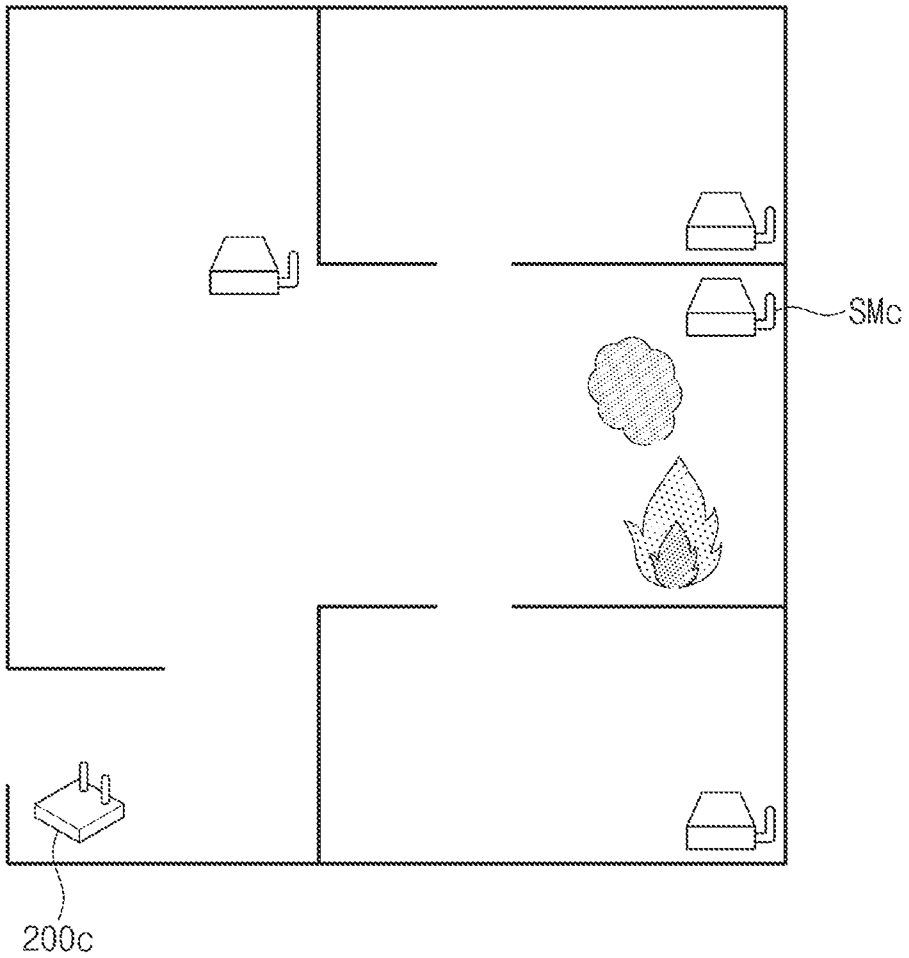
FIG. 10 illustrates the operation of a fire alarm apparatus according to an embodiment of the inventive concept.

FIG. 10 illustrates the operation of a fire alarm apparatus according to an embodiment of the inventive concept.

Referring to FIGS. 1, 6, and 10, the fire alarm apparatus 10 having a non-fire alarm prevention function may be installed and used in a building.

The big data reception unit BDR may receive data corresponding to the fire occurrence probability by date from an external second server BD.

The first date may be a date corresponding to summer. The second date may be a date corresponding to winter. The second date may have a higher probability of occurrence of a fire than the first date. A first date may be referred to as a first context, and a second date may be referred to as a second context.

Humidity in winter may be lower than humidity in summer. Fires may be more likely to occur in winter than in summer. The non-fire alarm determination unit UWA may determine validity of the third fire detection signal SG-3 based on the first value detected by the sensing unit SMc in summer and the big data. The non-fire alarm determination unit UWA may determine validity of the third fire detection signal SG-3 based on the second value detected by the sensing unit SMc in winter and the big data.

For example, each of the first value and the second value may be a temperature sensed by the sensing unit SMc. The non-fire alarm determination unit UWA may determine validity of the third fire detection signal SG-3 based on the increase rate of the temperature measured from the sensing unit SMc for a predetermined time. The non-fire alarm determination unit UWA may apply the first criterion when determining the fire situation based on the first value because the possibility of a fire occurring in summer is low. The non-fire alarm determination unit UWA may determine validity of the third fire detection signal SG-3 based on the first value determined based on the first criterion and the big data. Since fires are more likely to occur in winter, the non-fire alarm determination unit UWA may apply a second criterion different from the first criterion when determining a fire situation based on the second value. The non-fire alarm determination unit UWA may determine validity of the third fire detection signal SG-3 based on the second value determined based on the second criterion and the big data.

According to the inventive concept, the big data may include data on the possibility of fire occurrence for each situation, and the non-fire alarm determination unit UWA may determine a fire situation based on different criteria for each situation with respect to values measured by each of the plurality of sensing units SM. The non-fire alarm determination unit UWA may determine validity of the third fire detection signal SG-3 based on the big data and values detected by each of the plurality of sensing units SM. Therefore, an optimal non-fire alarm determination may be made for each situation, and the reliability of the non-fire alarm determination may be improved.

Figure 11:
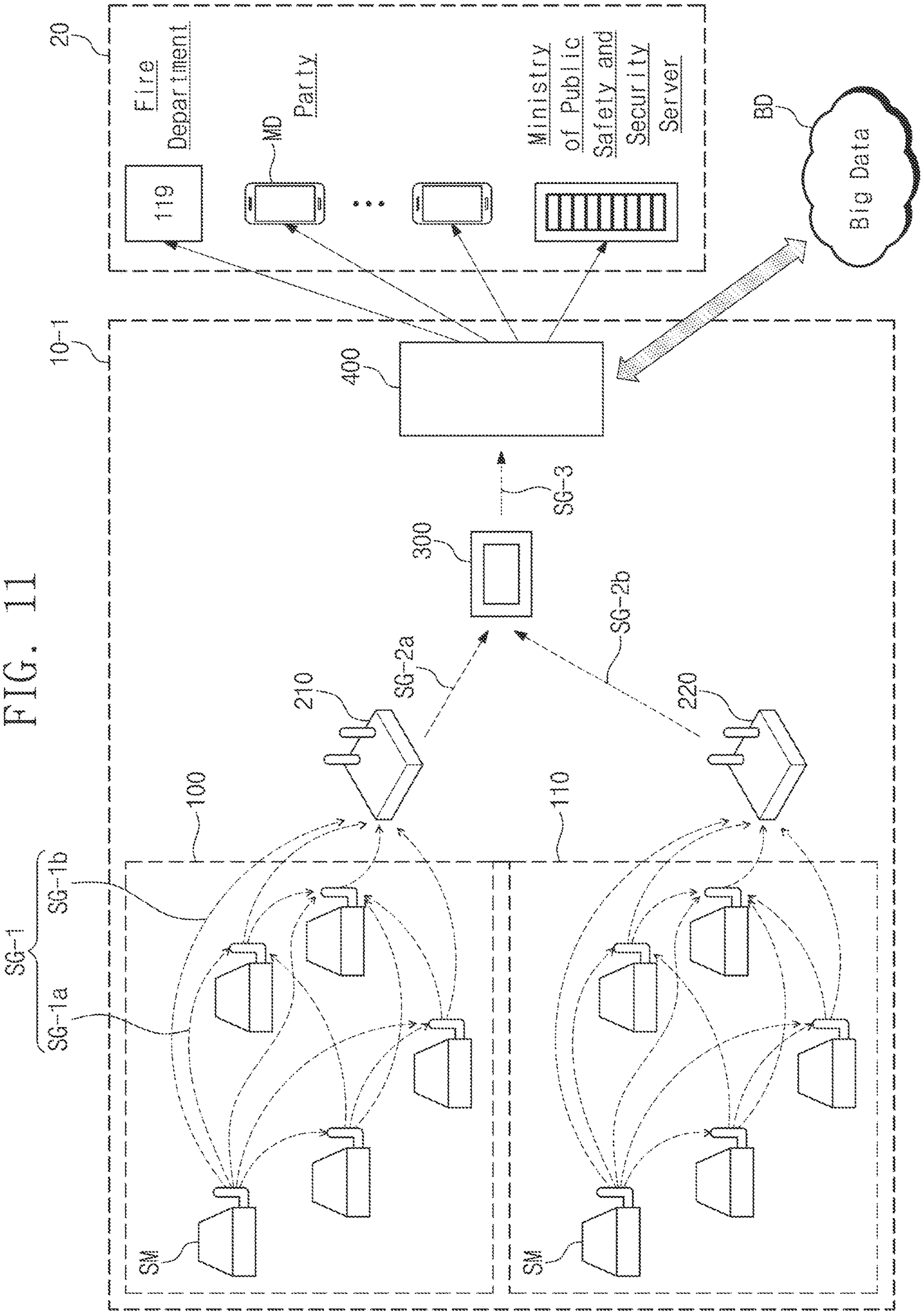
FIG. 11 illustrates a fire alarm apparatus having a non-fire alarm prevention function according to an embodiment of the inventive concept.

FIG. 11 illustrates a fire alarm apparatus having a non-fire alarm prevention function according to an embodiment of the inventive concept. In the description of FIG. 11, the same reference numerals are used for the components described with reference to FIG. 1, and a description thereof will be omitted.

Referring to FIG. 11, a fire alarm apparatus 10-1 having a non-fire alarm prevention function may include a first sensing system 100, a first repeater 210, a second sensing system 110, a second repeater 220, a receiver 300, and a first server 400.

The first sensing system 100 may include a plurality of sensing units SM. A plurality of sensing units included in the first sensing system 100 may be referred to as a plurality of first sensing units.

Each of the plurality of first sensing units may transmit a first fire detection signal SG-1 to neighboring sensing units SM and/or the first repeater 210.

The first repeater 210 may transmit a second fire detection signal SG-2 to the receiver 300.

The second sensing system 110 may include a plurality of sensing units SM. A plurality of sensing units included in the second sensing system 110 may be referred to as a plurality of second sensing units.

Each of the plurality of second sensing units may transmit the first fire detection signal SG-1 to adjacent sensing units SM and/or the second repeater 220.

The second repeater 220 may transmit a second fire detection signal SG-2 to the receiver 300.

The receiver 300 may communicate with the plurality of repeaters 210 and 220.

The first server 400 may communicate with the receiver 300. Although FIG. 11 shows that the first server 400 communicates with one receiver 300, the first server 400 may communicate with a plurality of receivers. This will be described later.

Figure 12A:
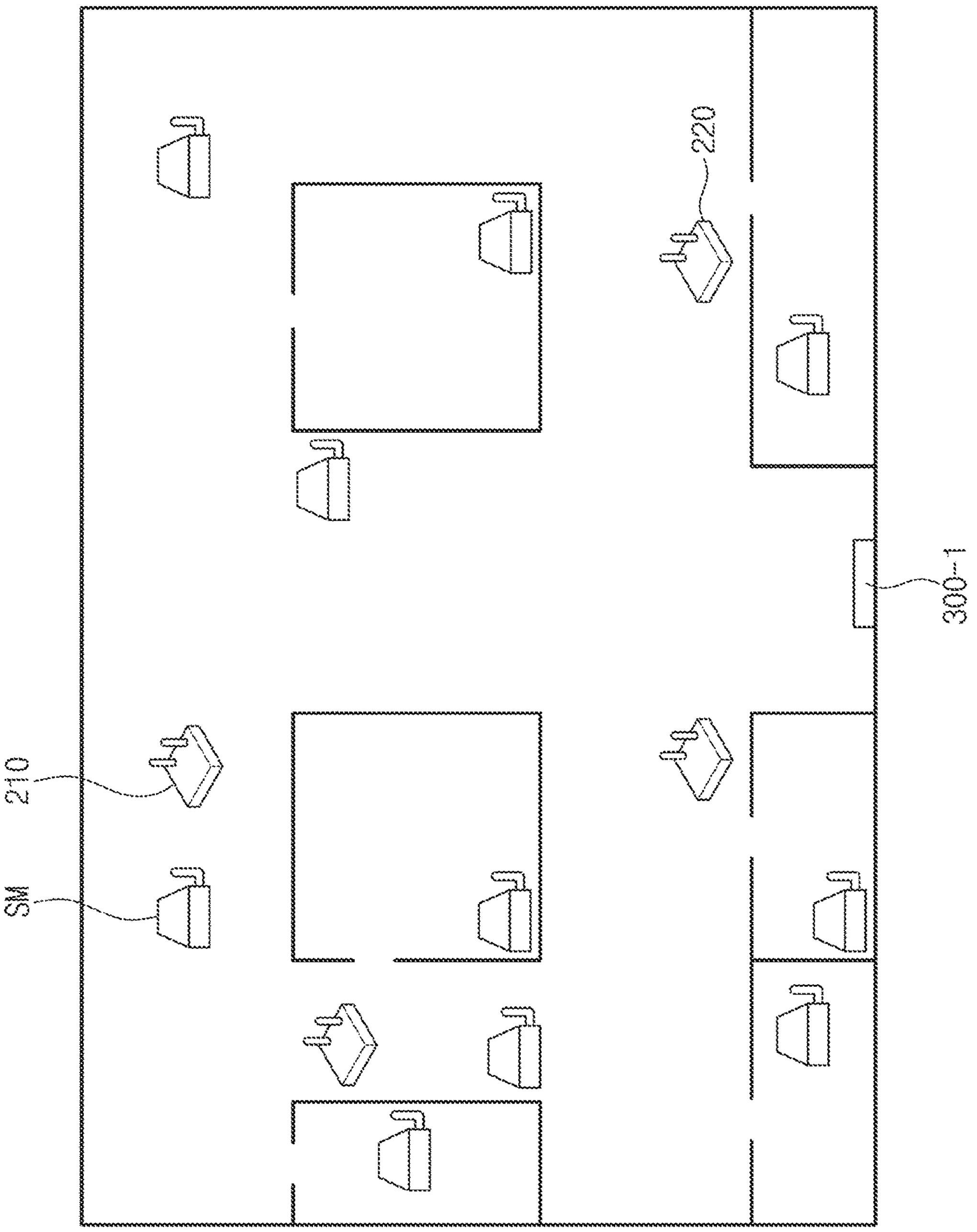
FIGS. 12A and 12B illustrate the operation of a fire alarm apparatus according to an embodiment of the inventive concept.
Figure 12B:
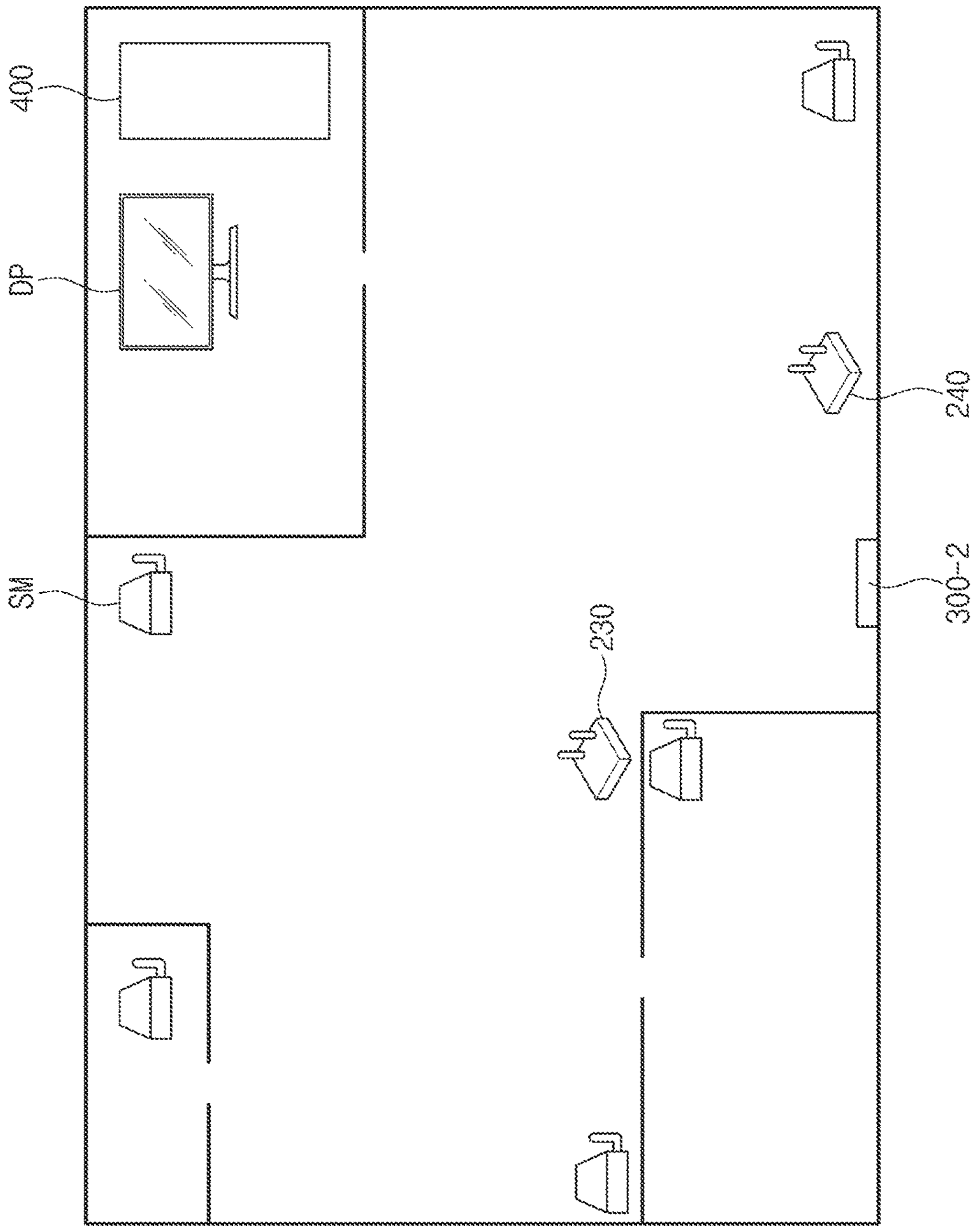

FIGS. 12A and 12B illustrate the operation of a fire alarm apparatus according to an embodiment of the inventive concept.

Referring to FIGS. 11, 12A, and 12B, the fire alarm apparatus 10-1 having a non-fire alarm prevention function may be installed and used in a building.

FIG. 12A shows one floor of the building, and FIG. 12B shows a different floor from FIG. 12A.

A plurality of sensing units SM may be respectively disposed in rooms and corridors of a building. The plurality of repeaters 210, 220, 230, and 240 may be arranged to easily receive signals from the plurality of sensing units SM. The receivers 300-1 and 300-2 may be placed one by one on each floor of the building. The first server 400 may be disposed in a situation room of a building, and a display DP for managing a fire situation may be disposed in the situation room.

According to the inventive concept, each of the plurality of repeaters 210, 220, 230, and 240 may receive a first fire detection signal SG-1 from a plurality of sensing units SM, and each of the plurality of receivers 300-1 and 300-2 may receive second fire detection signals SG-2*a* and SG-2*b* from the plurality of repeaters 210, 220, 230, and 240. The fire alarm apparatus 10-1 may quickly communicate a fire situation that may occur on each floor of a building through wireless communication, and quickly grasp a fire situation in a control room where the first server 400 is disposed. Therefore, it is possible to provide a fire alarm apparatus 10-1 that may easily manage a fire situation.

Although described above with reference to a preferred embodiment of the inventive concept, a person skilled in the relevant technical field or a person having ordinary knowledge in the relevant technical field will be appreciated that various modifications and changes may be made to the inventive concept without departing from the spirit and scope of the inventive concept described in the claims to be described later. Accordingly, the technical scope of the inventive concept should not be limited to the contents described in the detailed description of the specification, but should be defined by the claims.

The invention claimed is:

1. A fire alarm apparatus with non-fire alarm prevention function, the apparatus comprising:

a plurality of sensing units having different address information and configured to generate a fire detection signal when each sensing unit detects at least one of smoke, temperature, humidity, and gas to determine a fire situation;

a repeater configured to perform wireless communication with each of the plurality of sensing units;

a receiver configured to perform wireless communication with the repeater; and a first server configured to perform wireless communication with the receiver and determine the fire situation based on the fire detection signal, wherein the first server comprises:

a big data reception unit configured to receive big data from an external second server; and a non-fire alarm determination unit configured to determine validity of the fire detection signal based on the big data and values detected by each of the plurality of sensing units based on different criteria for each situation, wherein the non-fire alarm determination unit determines validity of the fire detection signal based on one of smoke, temperature, humidity, and gas detected by the plurality of sensing units in a first situation and the big data, and determines the validity of the fire detection signal based on the other one of smoke, temperature, humidity, and gas detected by the plurality of sensing units in a second situation different from the first situation and the big data.

2. The fire alarm apparatus of claim 1, wherein the non-fire alarm determination unit determines validity of the fire detection signal based on an increase rate of temperature measured from each of the plurality of sensing units for a predetermined time.

3. The fire alarm apparatus of claim 1, wherein the non-fire alarm determination unit determines whether a value detected by each of the plurality of sensing units is invalid data, including water vapor, cigarette smoke, and/or exhaust gas, using the big data.

4. The fire alarm apparatus of claim 1, wherein the big data comprises at least one of data corresponding to a probability of fire occurrence by date, data corresponding to a probability of fire occurrence by time, data corresponding to a probability of fire occurrence by space, data corresponding to a probability of fire occurrence by temperature, data corresponding to a probability of fire occurrence by humidity, data corresponding to a probability of fire occurrence by weather, data corresponding to a probability of fire occurrence by industry, and data corresponding to a probability of fire occurrence by user.

5. The fire alarm apparatus of claim 1, wherein the non-fire alarm determination unit determines validity of the fire detection signal based on values received from n sensing units and the big data in a first situation, and determines the validity of the fire detection signal based on values received from m sensing units and the big data in a second situation different from the first situation, wherein n is a positive integer, and m is a positive integer different from n.

6. The fire alarm apparatus of claim 1, wherein the first server further comprises:

a server memory configured to store information of parties corresponding to the address information;

a server reception unit configured to receive the fire detection signal from the receiver; and a server transmission unit configured to transmit a warning message to the parties.

7. The fire alarm apparatus of claim 6, wherein the non-fire alarm determination unit calculates a fire occurrence probability based on the big data and values measured by each of the plurality of sensing units, wherein, when the fire probability is greater than or equal to a predetermined value, the server transmission unit transmits a preliminary warning message to the parties.

8. The fire alarm apparatus of claim 1, wherein the receiver comprises:

a memory configured to store location information of each of the plurality of sensing units based on the address information; and a control unit configured to control each of the plurality of sensing units, wherein the non-fire alarm determination unit receives the location information from the receiver and determines validity of the fire detection signal based on the location information.

9. A fire alarm apparatus with non-fire alarm prevention function, the apparatus comprising:

a plurality of sensing units having different address information and configured to generate a fire detection signal when each sensing unit detects at least one of smoke, temperature, humidity, and gas to determine a fire situation;

a repeater configured to perform wireless communication with each of the plurality of sensing units;

a receiver configured to perform wireless communication with the repeater; and a first server configured to perform wireless communication with the receiver and determine the fire situation based on the fire detection signal, wherein the first server comprises:

a big data reception unit configured to receive big data from an external second server; and a non-fire alarm determination unit configured to determine validity of the fire detection signal based on the big data and values detected by each of the plurality of sensing units based on different criteria for each situation, wherein the non-fire alarm determination unit determines validity of the fire detection signal based on a first value detected by one of the plurality of sensing units in a first situation and the big data and determines validity of the fire detection signal based on a second value detected by one of the plurality of sensing units and the big data in a second situation different from the first situation, wherein a first criterion for determining that the non-fire alarm determination unit is a fire situation based on the first value in the first situation is different from a second criterion for determining the fire situation based on the second value in the second situation.

10. A fire alarm apparatus with non-fire alarm prevention function, the apparatus comprising:

a plurality of first sensing units each configured to detect at least one of smoke, temperature, humidity, and gas to generate a fire detection signal when it is determined to be a fire situation, and to perform Radio Frequency (RF) communication with each other;

a first repeater configured to perform RF communication with the plurality of first sensing units;

a plurality of second sensing units each configured to detect at least one of smoke, temperature, humidity, and gas to generate a fire detection signal when it is determined to be a fire situation, and to perform the RF communication with each other;

a second repeater communicating with the plurality of second sensing units through the RF;

a receiver communicating with the first repeater and the second repeater; and a first server configured to perform wireless communication with the receiver and determine the fire situation based on the fire detection signal, wherein the first server comprises:

a big data reception unit configured to receive big data from an external second server; and a non-fire alarm determination unit configured to determine validity of the fire detection signal based on the big data and values detected by at least two neighboring sensing units among the plurality of sensing units, wherein the big data comprises data corresponding to the probability of fire occurrence for each space, wherein the non-fire alarm determination unit determines validity of the fire detection signal based on a first value detected by one of the plurality of sensing units at a first location and the big data, and determines validity of the fire detection signal based on a second value detected by one of the plurality of sensing units at a second location different from the first location and the big data, wherein the first value is a value obtained by detecting one of smoke, temperature, humidity, and gas, and the second value is a value obtained by detecting another one of smoke, temperature, humidity, and gas.

11. The fire alarm apparatus of claim 10, wherein the big data comprises data corresponding to the probability of occurrence of fire by time, wherein the non-fire alarm determination unit determines validity of the fire detection signal based on values received from n sensing units in a day time zone and the big data, and determines the validity of the fire detection signal based on values received from m sensing units in the night time zone and the big data, wherein n is a positive integer, m is a positive integer, and the n is greater than the m.

12. The fire alarm apparatus of claim 10, wherein the big data comprises data corresponding to the probability of occurrence of fire by date, wherein the non-fire alarm determination unit determines validity of the fire detection signal based on a first value detected by one of the plurality of sensing units on a first date and the big data, and determines validity of the fire detection signal based on a second value detected by one of the plurality of sensing units on a second date different from the first date and the big data, wherein a first criterion by which the non-fire alarm determination unit determines the first value as a fire condition on the first date is different from a second criterion for determining the second value as a fire condition on the second date.

* * * * *